United States Patent
Bent et al.

(10) Patent No.: US 9,667,720 B1
(45) Date of Patent: May 30, 2017

(54) SHARD REORGANIZATION BASED ON DIMENSIONAL DESCRIPTION IN SHARDED STORAGE SYSTEMS

(71) Applicant: EMC IP Holding Company LLC, Hopkinton, MA (US)

(72) Inventors: John M. Bent, Los Alamos, NM (US); Sorin Faibish, Newton, MA (US); Zhenhua Zhang, Beijing (CN); Xuezhao Liu, Beijing (CN); Haiying Tang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 235 days.

(21) Appl. No.: 14/319,666

(22) Filed: Jun. 30, 2014

(51) Int. Cl.
*H04L 29/08* (2006.01)
*G06F 17/30* (2006.01)

(52) U.S. Cl.
CPC .... *H04L 67/1097* (2013.01); *G06F 17/30194* (2013.01); *G06F 17/30283* (2013.01); *G06F 17/30289* (2013.01); *G06F 17/30292* (2013.01); *G06F 17/30318* (2013.01);
(Continued)

(58) Field of Classification Search
CPC ......... G06F 17/30575; G06F 17/30592; G06F 17/30194; G06F 17/30283; G06F 17/30289; G06F 17/30292; G06F 17/30318; G06F 17/30362; H04L 67/1097
USPC ............... 707/640, 705, 736, 737, 758, 770; 709/213
See application file for complete search history.

(56) References Cited

U.S. PATENT DOCUMENTS

2005/0071349 A1* 3/2005 Jordan .............. G06F 17/30592
2008/0040151 A1* 2/2008 Moore .................. G06F 19/322
705/2
(Continued)

OTHER PUBLICATIONS

Liu et al, "On the role of burst buffers in leadership-class storage systems", 2012 IEEE 28th Symposium on Mass Storage Systems and Technologies (MSST), San Diego CA, Apr. 16-20, 2012, pp. 1-11.*
(Continued)

*Primary Examiner* — Tony Mahmoudi
*Assistant Examiner* — Kamal Dewan
(74) *Attorney, Agent, or Firm* — Ryan, Mason & Lewis, LLP (57) ABSTRACT

Techniques are provided for shard reorganization in sharded storage systems based on a user-specified dimensional description or key range information. An exemplary method processes data in a sharded distributed data storage system that stores data in a plurality of shards by obtaining a dimensional description for a shard reorganization of the data in the sharded distributed data storage system from a user; and reorganizing a storage of the data on one or more nodes of the sharded distributed data storage system based on the dimensional description. The dimensional description comprises, for example, a semantic description of desired array dimensions or key range information. The semantic description of desired array dimensions comprises a striping of a given data array along one or more of a horizontal face, a vertical face and a sub-array of the given data array. The reorganization can be employed, for example, for key-value objects and multidimensional array objects.

20 Claims, 8 Drawing Sheets

(52) U.S. Cl.
 CPC .. *G06F 17/30362* (2013.01); *G06F 17/30575* (2013.01); *G06F 17/30592* (2013.01)

(56) References Cited

U.S. PATENT DOCUMENTS

| | | | | |
|---|---|---|---|---|
| 2010/0281078 | A1* | 11/2010 | Wang | G06F 17/30445 707/812 |
| 2011/0016127 | A1* | 1/2011 | Uppala | G06F 17/30445 707/737 |
| 2011/0119272 | A1* | 5/2011 | Mansfield | G06F 17/30731 707/739 |
| 2011/0225122 | A1* | 9/2011 | Denuit | G06F 17/30174 707/634 |
| 2011/0302226 | A1* | 12/2011 | Abadi | G06F 17/30569 707/825 |
| 2013/0124809 | A1* | 5/2013 | DeJana | G06F 17/30492 711/165 |
| 2013/0290249 | A1* | 10/2013 | Merriman | G06F 17/30578 707/610 |
| 2014/0108421 | A1* | 4/2014 | Isaacson | G06F 17/30575 707/747 |
| 2014/0122510 | A1* | 5/2014 | Namkoong | G06F 17/30584 707/755 |
| 2015/0095351 | A1* | 4/2015 | Balikov | G06F 17/30312 707/752 |
| 2015/0134780 | A1* | 5/2015 | Weber | G06F 17/30091 709/219 |

OTHER PUBLICATIONS

Bent et al, "PLFS: A Checkpoint Filesystem for Parallel Applications", Proceedings of the Conference on High Performance Computing Networking, Storage and Analysis, Portland, Oregon, USA, Nov. 14-20, 2009, pp. 1-12.*

"The Fast-Forward I/O and Storage Stack", https://users.soe.ucsc.edu/~ivo//blog/2013/04/07/the-ff-stack/.

* cited by examiner

SHARD REORGANIZATION BASED ON DIMENSIONAL DESCRIPTION IN SHARDED STORAGE SYSTEMS

CROSS-REFERENCE TO RELATED APPLICATIONS

The present application is related to U.S. patent application Ser. No. 14/230,829, filed Mar. 31, 2014, entitled "Distributed Metadata in a High Performance Computing Environment," incorporated by reference herein

FIELD

The present invention relates to parallel storage in high performance computing environments.

BACKGROUND

In parallel computing systems, such as High Performance Computing (HPC) applications, data storage systems must deal with the increasing amounts of data to be processed. As HPC environments grow to exascale (and larger) by becoming more distributed, sharded storage arrays comprised of a very large number of storage devices are expected to be employed. In sharded storage arrays, a user stores data on each storage device by first creating horizontally partitioned "shards" on each storage device. A serial stream of bytes is then typically written as stripes in a round-robin fashion across shards. In order to parallelize Input/Output (I/O) operations on the sharded storage arrays, it is desirable to have shards on a large number (if not all) of the available storage devices.

A need exists for improved techniques for reorganizing stored data according to user requests (e.g., based on a dimensional description or range information) to allow groups of sub-objects to be stored together, for example, to facilitate analysis tasks that require such groups of data.

SUMMARY

Embodiments of the present invention provide improved techniques for shard reorganization in sharded storage systems based on a user-specified dimensional description or key range information. In one embodiment, a method is provided for processing data in a sharded distributed data storage system, wherein the sharded distributed data storage system stores the data in a plurality of shards on one or more storage nodes. The exemplary method comprises the steps of obtaining a dimensional description for a shard reorganization of the data in the sharded distributed data storage system from a user; and reorganizing a storage of the data on one or more nodes of the sharded distributed data storage system based on the dimensional description.

The dimensional description comprises, for example, a semantic description of desired array dimensions or key range information. The semantic description of desired array dimensions comprises a striping of a given data array along one or more of a horizontal face, a vertical face and a sub-array of the given data array.

In one exemplary embodiment, the reorganization stores a collection of sub-objects together on a single node of the sharded distributed data storage system for one or more analysis tasks. The reorganizing comprises one or more of a persist operation and a fetch operation. The reorganizing can be performed in conjunction with a storage of the data on a sharded data storage array and/or a fetching of the data from the sharded data storage array.

When the data comprises a plurality of key-value objects, the reorganizing the plurality of key-value objects splits the plurality of key-value objects at one or more specified split points for storage on a plurality of specified nodes in the sharded distributed data storage system. When the data comprises one or more multidimensional array objects, the reorganizing the multidimensional array objects splits the one or more multidimensional array objects into one or more sub-arrays based on the dimensional description for storage on a plurality of specified nodes in the sharded distributed data storage system.

Advantageously, illustrative embodiments of the invention provide techniques for shard reorganization in sharded storage systems based on a user-specified a dimensional description. These and other features and advantages of the present invention will become more readily apparent from the accompanying drawings and the following detailed description.

DETAILED DESCRIPTION

The present invention provides improved techniques for shard reorganization in sharded storage systems based on a user-specified dimensional description (e.g., key range information). Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Aspects of the present invention provide improved techniques for storing data on sharded storage arrays within High Performance Computing (HPC) environments. In High-Performance Computing (HPC) environments, increasing scale has made it clear that two changes are necessary in future storage architectures. First, a network attached flash tier is needed for storing large amounts of data and metadata, such as checkpoints, before the data is asynchronously migrated to a large disk tier. In addition, a new storage interface is needed to replace Portable Operating System Interface (POSIX). According to one aspect of the invention, both challenges are addressed with an Input/Output (IO) Dispatcher (IOD) that manages the burst buffer tier. Generally, the IOD will manage the storage of data and/or metadata on sharded storage arrays.

Aspects of the present invention recognize that an understanding of the dimensionality of multi-dimensional data structures permits the data to be reorganized (e.g., layout resharding) according to a user-specified dimensional description (e.g., semantic descriptions of array dimensions, such as vertical or horizontal data stripes, or key range information). For example, a user may request that a given data array is striped along the vertical faces of the array. In this manner, collections of sub-objects can be stored together on a single node to enable analysis tasks that require such a collection to be read entirely from the local node.

Figure 1:
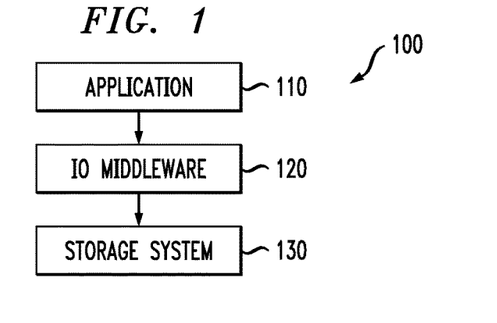
FIG. 1 illustrates an exemplary software stack comprising an application layer, an I/O middleware layer and a storage layer.

FIG. 1 illustrates an exemplary software stack 100 comprising an application layer 110, an I/O middleware layer 120 and a storage system 130. Generally, in the application layer 110, an exemplary application needs to perform the following tasks:

1. For a write of data, the application layer 110 provides data to the I/O middleware layer 120. In one embodiment, the I/O dispatcher or another entity in the I/O middleware layer 120 determines the metadata (including checksums) for the received data.

2. For a read of data, the I/O middleware layer 120 will return the data from the storage layer 130 to the application layer 110. The I/O middleware layer 120 may have to perform multiple read operations from multiple buffers and verification and recomputation of checksum values if the data chunks are not aligned.

The I/O middleware layer 120 will move data and the corresponding metadata value(s) to the storage system 130. For some intelligent I/O middleware 120, however, such as the I/O dispatcher, the I/O middleware layer 120 will do additional work with the data to obtain better performance. For example, if an application does not provide a checksum value, I/O middleware 120, such as the I/O dispatcher, will optionally compute the checksum value.

The storage layer 130 must store the data and the corresponding metadata value(s) into the desired storage device.

Figure 2:
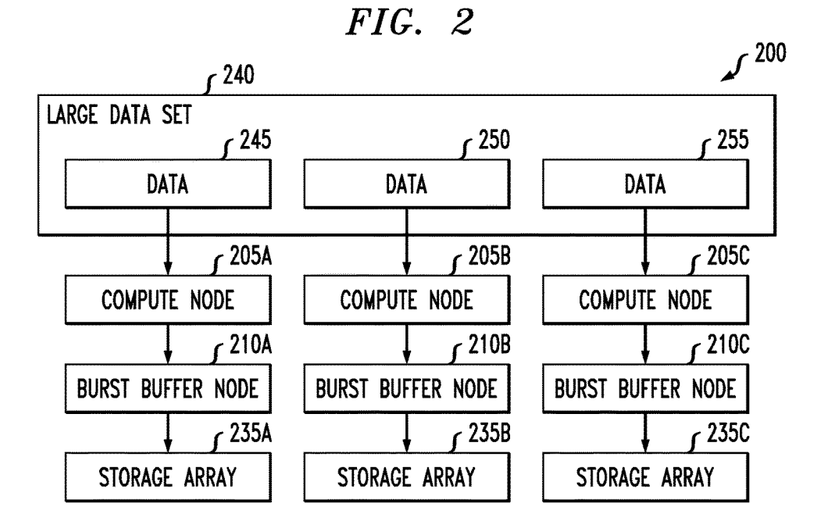
FIG. 2 illustrates an exemplary High Performance Computing (HPC) environment, in accordance with an embodiment of the present invention.

FIG. 2 illustrates an exemplary High Performance Computing (HPC) Environment 200, in accordance with an embodiment of the present invention. In the exemplary HPC environment 200 of FIG. 2, one or more computing nodes communicate with one or more burst buffers and data storage arrays. In various embodiments, the current disclosure may enable a HPC environment to distribute data and/or metadata (including checksum values) throughout an HPC environment on one or more data storage systems.

In the exemplary embodiment of FIG. 2, a large data set 240 is divided into two or more portions of data, such as data portions 245, 250, 255, to enable more efficient processing by each compute node. The data portions 245, 250, 255 may be generated on and processed by one or more compute nodes 205A-C. As shown in FIG. 2, data portion 245 is processed on compute node 205A, data portion 250 is processed on compute node 205B and data portion 255 is processed on compute node 205C. As discussed further below in conjunction with FIG. 3, I/O dispatchers (not shown in FIG. 2) manage data received from corresponding compute nodes 205.

While the exemplary embodiment of FIG. 2 suggests a one-to-one mapping between the burst buffer nodes 210 and storage nodes 235, I/O dispatchers may shuffle data between the burst buffer nodes 210 before sending it to storage nodes 235 (e.g., DAOS, as discussed below). The data in the burst buffer nodes 210 is logged and optionally shuffled so that the data on the storage nodes 235 is striped. Also, as discussed further below, the metadata on the burst buffer nodes 210 is logged and it also gets shuffled so that it will be striped alongside its data on storage nodes 235 (e.g., DAOS).

It is noted that it is not required that the data is shuffled first. Instead, every burst buffer node 210 can write each of its pieces of data to wherever it will eventually go in the DAOS shards. However, this means that there will be N-squared connections as potentially every burst buffer node 210 will send small data to each DAOS shard. The shuffling is optionally performed so that instead one burst buffer 210 collects all of the data going to one shard from the other burst buffers 210 and then does one write to that shard. This reduces the number of writers per shard to just one writer process and translates a plurality of small I/O operations into one larger I/O operation.

It is further noted that small I/Os still occur during the shuffle phase. It has been found, however, that it is better to do small I/O during the shuffle phase than during the write phase since the shuffling happens on an interconnect network between the burst buffer nodes 210 as opposed to the much slower storage network connecting the DAOS shards to the burst buffer nodes 210.

Additionally, on a read, each burst buffer 210 can read from one DAOS shard only and then shuffle between the burst buffers 210. Thus, the small I/Os occur between burst buffers 210 either before sending large I/Os to DAOS or after receiving large I/Os from DAOS.

In various embodiments, each compute node 205 may be in communication with a corresponding burst buffer appliance 210A-C which may be in communication with one or more corresponding data storage arrays 235A-C. The burst buffer appliances 210 may also be referred to as I/O Nodes (IONs). As discussed further below in conjunction with FIG. 3, an exemplary burst buffer appliance 210 may include an I/O dispatcher. In some embodiments, a fast data storage buffer may be flash storage and/or another fast storage device.

FIG. 2 illustrates a workload comprised of a large parallel application executing on the compute nodes 205 and potentially a secondary analysis program running directly on the burst buffer appliances 210. In a further variation, multiple process groups can share burst buffer appliances 210. To share data among burst buffer appliances 210, the application on the compute nodes 205 and the analysis program on the burst buffer appliances 210 must be connected to the same set of I/O dispatcher (not shown in FIG. 2) processes.

In the exemplary embodiment of FIG. 2, compute node 205A is in communication with burst buffer node 210A, which is in communication with data storage array 235A. Compute node 205B is in communication with burst buffer node 210B, which is in communication with data storage array 235B. Compute node 205C is in communication with burst buffer node 210C, which is in communication with data storage array 235C.

In the embodiment of FIG. 2, each burst buffer node 210 is enabled to communicate with other burst buffer nodes 210 to enable creation, deletion, and/or management of metadata stored on each respective burst buffer node 210, as discussed further below in conjunction with FIG. 3.

Figure 3:
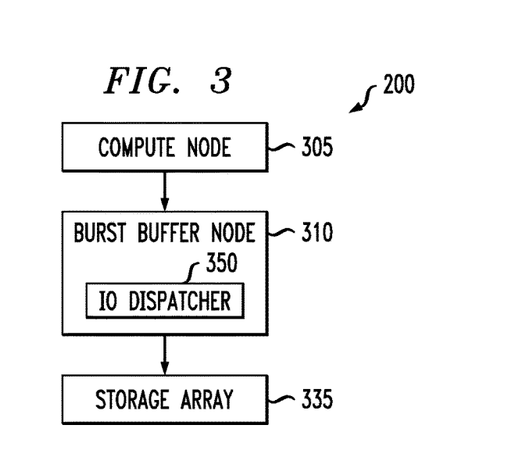
FIG. 3 illustrates portions of the exemplary High Performance Computing (HPC) environment of FIG. 2 in further detail.

FIG. 3 illustrates portions of the exemplary High Performance Computing (HPC) environment 200 of FIG. 2 in further detail. As shown in FIG. 3, the exemplary HPC environment 200 comprises an exemplary compute node 305 in communication with a burst buffer appliance 310, which may be in communication with one or more data storage arrays 335. Generally, as discussed further below, compute node 305 sends one or more data chunks and corresponding metadata to be processed by burst buffer node 310, in accordance with an embodiment of the present invention.

The data storage arrays 335 may be implemented, for example, as Distributed Application Object Storage (DAOS) sharded storage arrays. See, for example, "The Fast-Forward I/O and Storage Stack," https://users.soe.ucsc.edu/~ivo//blog/2013/04/07/the-ff-stack/, and/or "Fast Forward Storage and IO Program Documents," https://wiki.hpdd.intel.com/display/PUB/Fast+Forward+Storage+and+IO+Program+Documents, each incorporated by reference herein.

The exemplary burst buffer node 310 further comprises an I/O dispatcher 350. As discussed hereinafter, the I/O dispatcher 350 processes any received data based on the indicated object type and the storage destination. In one exemplary implementation, the data may comprise a blob, a multidimensional array or a key-value object type. Array objects store structured multi-dimensional data structures. Blob objects are analogous to POSIX files: one-dimensional arrays (e.g., streams) of bytes. Key-value objects are stored in a parallel key-value store. In this manner, aspects of the present invention support storage of user data in structured array objects, unstructured "blob" objects and key-value objects.

Generally, data having a blob or array object type is transformed out of a PLFS environment in the burst buffer node 310 for storage on storage array 335. See, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein. Likewise, data having a key-value object type is stored in an MDHIM server (not shown). For a more detailed discussion of MDHIM, see, for example, James Nunez et al., "Multi-dimensional Data Hashing Indexing Metadata/Middleware (MDHIM) Project," Ultrascale Systems Research Center, High Performance Computing Systems Integration (2012-2013), incorporated by reference herein.

The burst buffer node 310 is assumed to comprise a flash memory or other high-speed memory having a substantially lower access time than a disk storage tier. The burst buffer node 310 may optionally comprise an analytics engine, and may include other components. Although flash memory will often be used for the high-speed memory of the burst buffer node 310, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer node" or "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes and a file system such as storage tiers, for storing bursts of data associated with different types of I/O operations.

The burst buffer node 310 further comprises a processor coupled to a memory (not shown in FIG. 3). The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

As discussed hereinafter, the exemplary I/O dispatcher 350 performs any necessary recomputations when requested data chunks are not aligned.

In FIG. 3, an I/O dispatcher 350 in a given burst buffer node 310 is enabled to communicate with other I/O dispatchers on other burst buffer nodes 310 to coordinate and/or synchronize data, transactions, checkpoints, and/or events stored at the respective I/O dispatcher.

The exemplary I/O dispatcher 350 processes three exemplary object types, namely, blobs (in a similar manner to existing POSIX directories); arrays (when stored, arrays are "unrolled" into a blob); and key-value stores. Containers provide a mechanism for grouping multiple objects together. It is noted that key-value stores typically store checksums as a header in the value portion of the record. Additional metadata can be stored in the key-value header as well, such as value length.

As noted above, data is stored in the burst buffer node 310 in PLFS-style logfiles. When the PLFS data is migrated to the storage array 335, the exemplary I/O dispatcher 350 will "flatten" the data into a serial stream of bytes as stripes in a round-robin fashion across shards.

Figure 4:
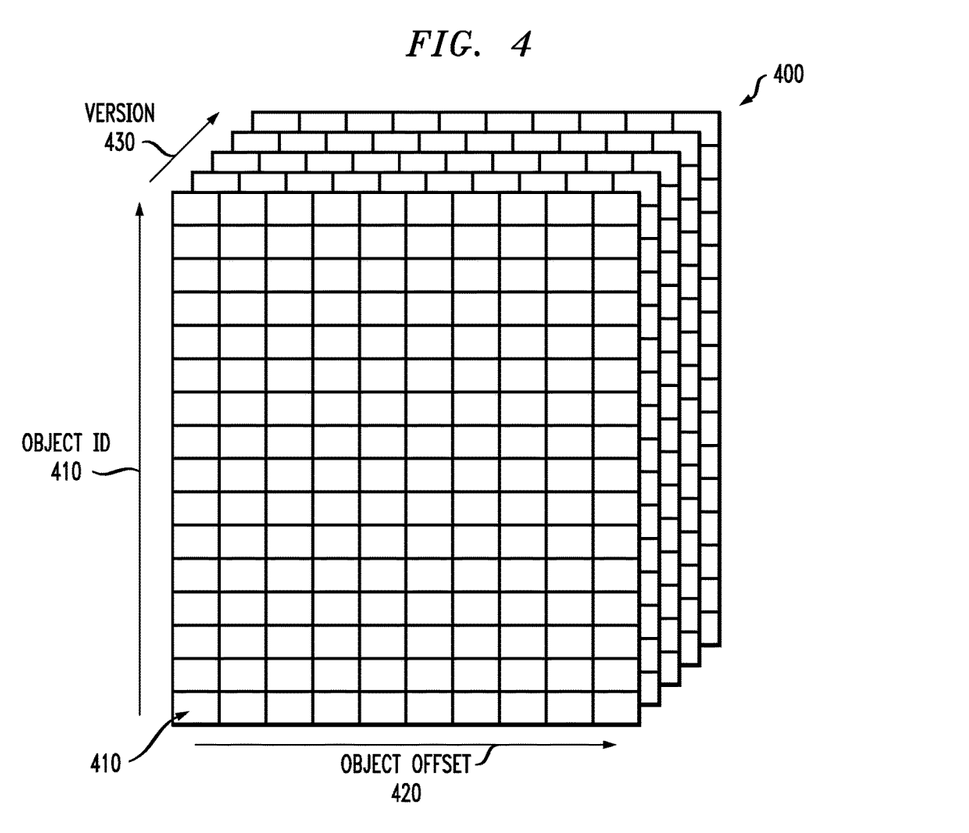
FIG. 4 illustrates an exemplary conventional shard on a given storage device in the sharded storage array of FIG. 3.

FIG. 4 illustrates an exemplary conventional shard 400 on a given storage device in the sharded storage array 335 of FIG. 3. As shown in FIG. 4, an exemplary shard 400 is a three-dimensional structure with an object identifier 410 identifying each stored object in a first dimension, an object offset 420 identifying the offset of the stored object in a second dimension, and an optional version identifier 430 identifying the version of the stored object in a third dimension. For example, an object having identifier 13 will be striped across all shards at object 13. In one exemplary implementation, the starting shard for a given object will be randomly varied so that not all objects start on shard 0. Thus, each stored object has an associated starting shard identifier indicating which shard has the first stripe of the object. The object offset 420 allows each object to be addressable with a particular granularity, such as a byte. Each element in the array 400, such as element 410, corresponds to a data chunk.

Shard Reorganization

As noted above, aspects of the present invention recognize that an understanding of the dimensionality of multidimensional data structures permits the data to be reorganized (e.g., layout resharding) according to a user-specified dimensional description (e.g., semantic descriptions of array dimensions, such as vertical or horizontal data stripes, or key range information) (e.g., to improve data locality for future reads such as analysis or a checkpoint restart). For example, a user may request that a given data array is striped along the vertical faces of the array. In this manner, collections of sub-objects can be stored together on a single node to enable analysis tasks that require such a collection to be read entirely from the local node.

Figure 5:
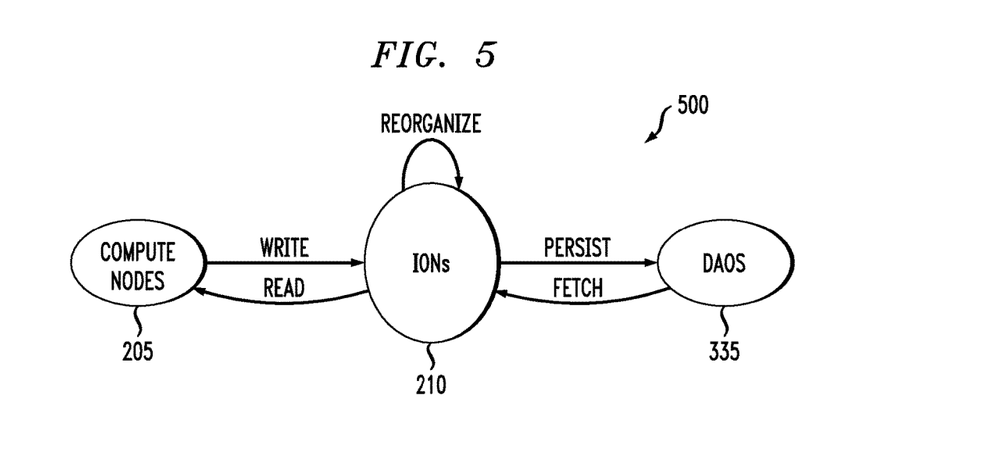
FIG. 5 illustrates a user-specified movement of data in the exemplary HPC environment of FIGS. 2 and 3.

FIG. 5 illustrates the user-specified movement of data in the exemplary HPC environment 200 of FIGS. 2 and 3. As shown in FIG. 5, one or more compute nodes can write data to one or more I/O nodes 210 and read the stored data back from the I/O node(s) 210. In addition, the one or more I/O nodes 210 can persist stored data to one or more DAOS data storage arrays 335 and fetch persisted data from the one or more DAOS data storage arrays 335. In addition, the I/O node(s) 210 can reorganize stored data in accordance with aspects of the present invention. In one exemplary implementation, one or more I/O dispatchers 350 executing on one or more I/O node(s) 210 is responsible for data movement into and out of storage targets on the I/O nodes 210 and DAOS data storage arrays 335.

As discussed hereinafter, the persist and fetch operations allow the shard reorganizations to be performed in accordance with aspects of the present invention. In this manner, data can be reorganized in accordance with aspects of the present invention when data is stored to DAOS data storage arrays 335 and/or fetched from DAOS data storage arrays 335.

For Key-Value objects, the exemplary I/O dispatchers 350 supports the following operations:
    iod_kv_set(obj=O, trans=T, key=K, val=V, . . . )
    iod_obj_fetch( . . . )
For example, the fetch operation allows a sorted key-value store to be split at a specified split points (e.g., key range or ranges above and below a specified key value) and stripe them across a specified set of I/O node(s) 210. In this manner, given key ranges can be stored on specified I/O node(s) 210.

For multidimensional array objects, the exemplary I/O dispatchers 350 supports the following operations:
    iod_array_write(obj=0, trans=T, mem_descriptors=M, array_descriptors=A, . . . )
    iod_obj_fetch( . . . )
For example, the fetch operation allows an array to be split into sub-arrays using specified dimensionalities and stripe them across a specified set of I/O node(s) 210.

Figure 6A:
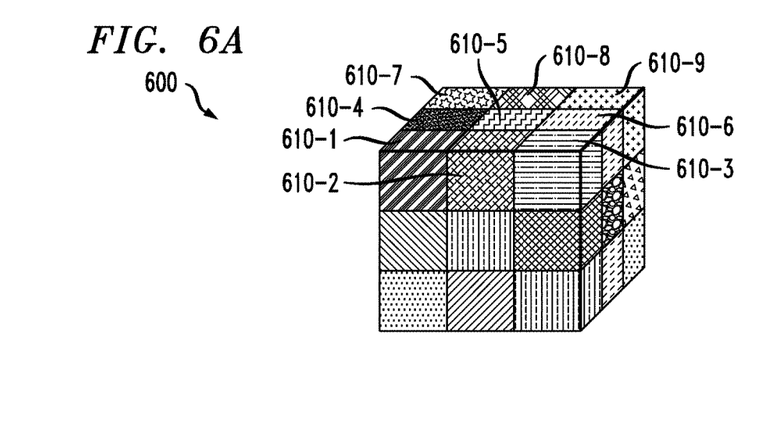
FIG. 6A illustrates a logical view of a multidimensional array object.

FIG. 6A illustrates a logical view of a multidimensional array object 600. As shown in FIG. 6, the multidimensional array object 600 comprises a 3-by-3-by-3 array of data objects. Each vertical column 610-1 through 610-9 in the exemplary multidimensional array object 600 comprises three data objects.

Figure 6B:
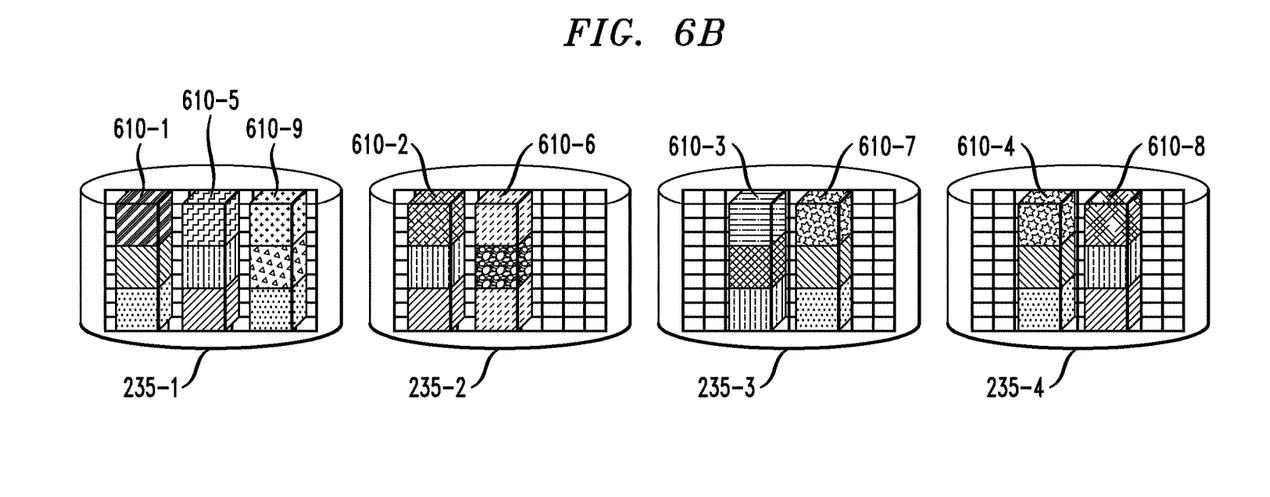
FIG. 6B illustrates the storage of the multidimensional array object of FIG. 6A stored on a plurality of storage targets in the storage array of FIG. 2 using an exemplary round-robin column striping.

FIG. 6B illustrates the storage of the multidimensional array object 600 of FIG. 6A on a plurality of DAOS storage targets 235-1 through 235-4 in storage array 235 using round-robin column striping. As shown in FIG. 6B, DAOS storage target 235-1 stores vertical columns 610-1, 610-5 and 610-9; DAOS storage target 235-2 stores vertical columns 610-2 and 610-6; DAOS storage target 235-3 stores vertical columns 610-3 and 610-7; and DAOS storage target 235-4 stores vertical columns 610-4 and 610-8.

Figure 6C:
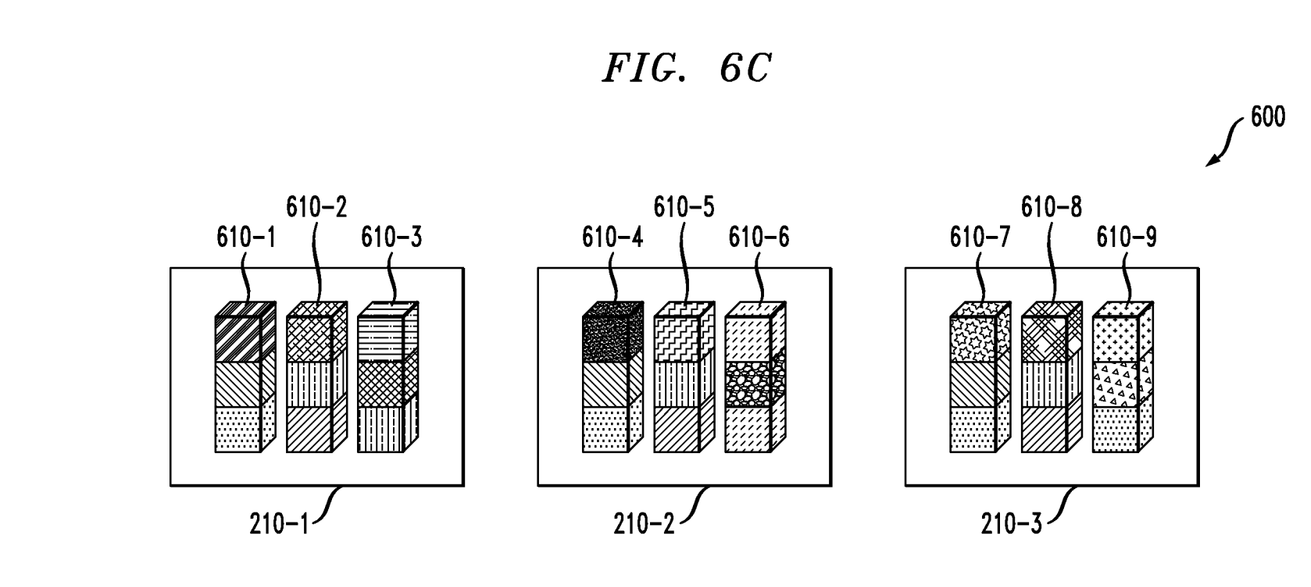
FIG. 6C illustrates the storage of the multidimensional array object of FIG. 6A on a plurality of I/O node(s) of FIG. 2 based on a user-specified dimensional description.

FIG. 6C illustrates the storage of the multidimensional array object 600 of FIG. 6A on a plurality of I/O node(s) 210 based on a user-specified dimensional description (e.g., key range information). For example, the user may request that I/O dispatcher 350 fetch the multidimensional array object 600 from the plurality of DAOS storage targets 235-1 through 235-4 in storage array 235 "along vertical faces" into each I/O node 210-1 through 210-3. Thus, each I/O node 210 will store a different vertical stripe or slice of the multidimensional array object 600. As shown in FIG. 6C, I/O node 210-1 stores vertical columns 610-1 through 610-3; I/O node 210-2 stores vertical columns 610-4 through 610-6; and I/O node 210-3 stores vertical columns 610-7 through 610-9.

Figure 7A:
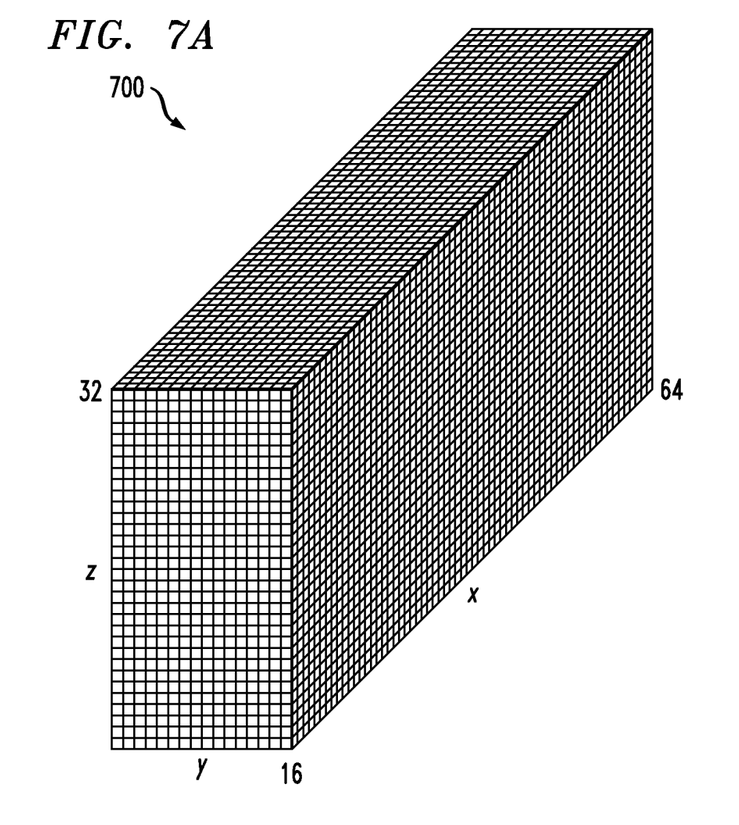
FIG. 7A illustrates a logical view of a multidimensional array object.
Figure 7B:
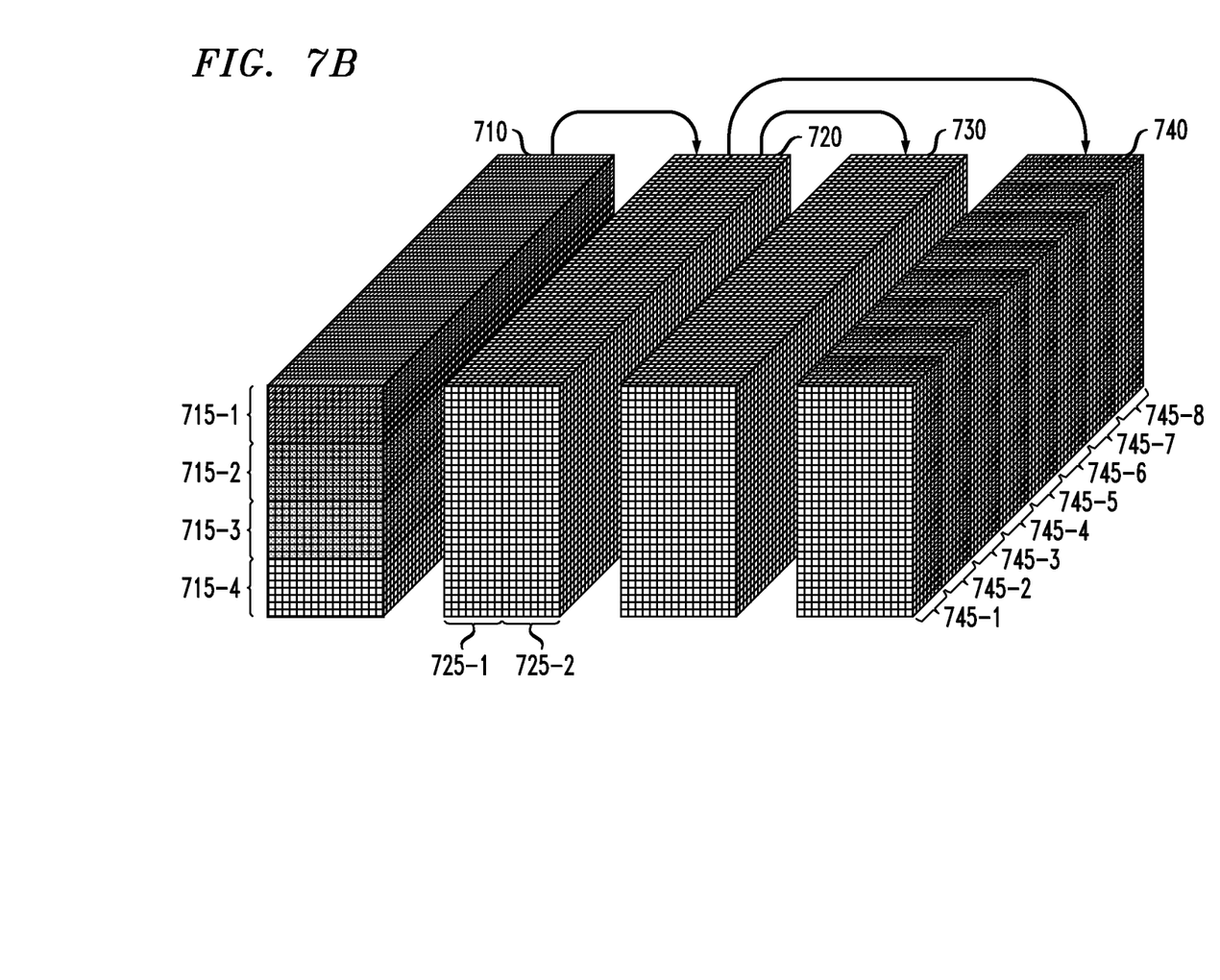
FIG. 7B illustrates various transformations of the multidimensional array object of FIG. 7A in accordance with aspects of the present invention.

FIG. 7A illustrates a logical view of a 16×32×64 multidimensional array object 700. FIG. 7B illustrates various transformations of the multidimensional array object 700 of FIG. 7A in accordance with aspects of the present invention.

FIG. 7B illustrates a stored view 710 of the array object 700, where four horizontal slices 715-1 through 715-4 are stored on four different storage nodes 210, 235. For example, four distributed rank MPI processes on four distinct I/O nodes 210 can write the array 700, such that each I/O node 210 stores a different horizontal slice 715-1 through 715-4. The horizontal slices 715-1 through 715-4 can then be read from the I/O nodes 210 by the same or a different set of distributed rank MPI processes.

In order to reorganize the data, the user creates a sharding specification (e.g., a user-specified dimensional description) and persists the data to the DAOS storage array 235. For, example, FIG. 7B illustrates a reorganized view 720 of the array object 700, where two sets 725-1, 725-2 of eight veritical data slices are stored on the DAOS storage array 235, with each of the eight veritical data slices stored on a different DAOS storage target. The veritical data slices can then be read by rank MPI processes distributed on distinct I/O nodes 210.

In addition, FIG. 7B illustrates the creation of two replicas 730 and 740 of the array object 700 that are fetched into I/O nodes 210 based on respective user-created sharding specifications. The replicas 730 and 740 or desired portions thereof can then be read by rank MPI processes distributed on distinct I/O nodes 210. For example, replica 740 is comprised of multiple sets 745 of four vertical slices, with each of the four veritical data slices stored on a different I/O node 210. In this manner, each vertical slice is stored on different I/O nodes 210.

While the shard reorganization techniques of the present invention have been primarily illustrated herein with respect to horizontal and vertical slices, aspects of the present invention can also be applied to arbitrary chunks (sub-arrays) of a multidimensional array object, such as the multidimensional array object 700 of FIG. 7A. For example, the user can define the desired arbitrary chunks using x, y, z coordinates.

Figure 8:
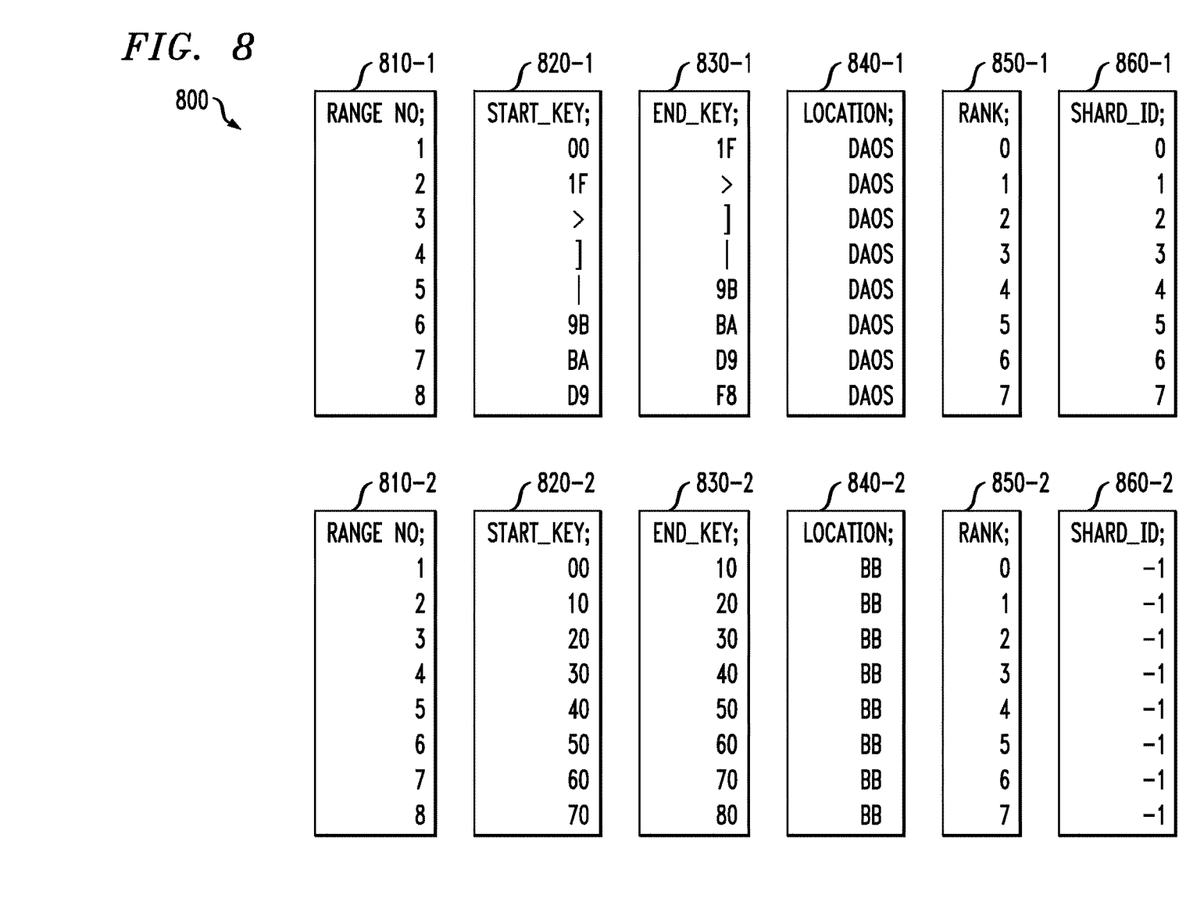
FIG. 8 illustrates a reorganization of key-value data in accordance with aspects of the present invention.

FIG. 8 illustrates a reorganization of key-value data 800 in accordance with aspects of the present invention. As shown in FIG. 8, a first record comprised of a range field 810-1, a start-key field 820-1, an end-key field 830-1, a location field 840-1, a rank field 850-1 and a shard_identifier field 860-1 provides information for a key-value object stored on various identified ranks and shards in a DAOS storage array. The second record comprised of range field 810-2, start-key field 820-2, end-key field 830-2, location field 840-2, rank field 850-2 and shard_identifier field 860-2 provides a dimensional description for a shard reorganization of the key-value data, when the sub-set of the key-value data is fetched from the DAOS storage array to a burst buffer (BB). For example, while the first range of the key-value object on the DAOS storage array comprises extends from start_key 00 through end_key 1F, the sub-set of the key-value data that is fetched to the burst buffer only extends from start_key 00 through end_key 10.

Conclusion

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

Figure 9:
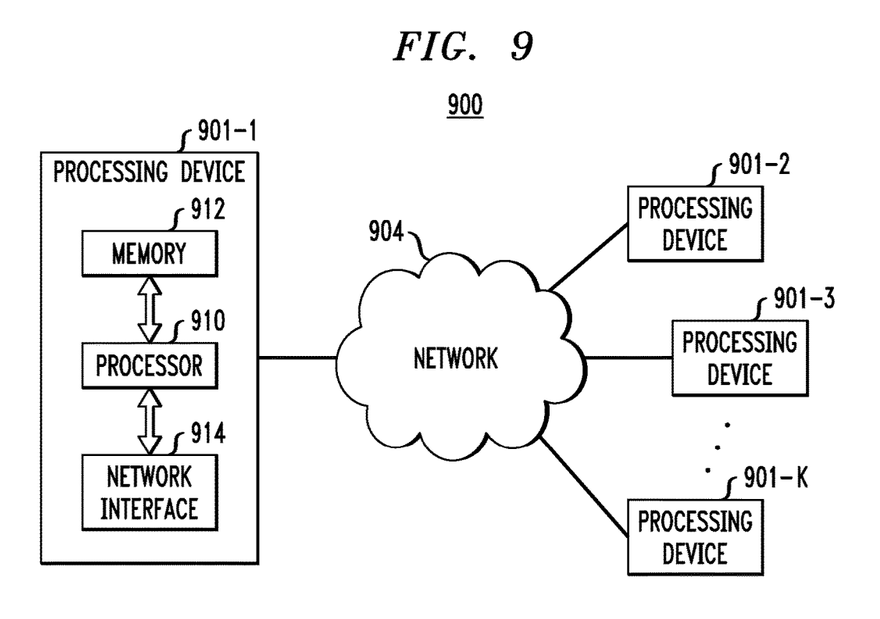
FIG. 9 illustrates an exemplary processing platform in which aspects of the present invention can be employed.

FIG. 9 illustrates an exemplary processing platform in which aspects of the present invention can be employed. The exemplary processing platform 900 comprises a plurality of processing devices, denoted 901-1, 901-2, 901-3, ... 901-K, that communicate with one another over a network 904. The network 904 may comprise any type of network, such as a WAN, a LAN, a satellite network, a telephone or cable network, or various portions or combinations of these and other types of networks.

The processing device 901-1 in the processing platform 900 comprises a processor 910 coupled to a memory 912. The processor 910 may comprise a microprocessor, a microcontroller, an application-specific integrated circuit (ASIC), a field-programmable gate array (FPGA) or other type of processing circuitry, as well as portions or combinations of such circuitry elements, and the memory 912, which may be viewed as an example of a "computer program product" having executable computer program code embodied therein, may comprise random access memory (RAM), read-only memory (ROM) or other types of memory, in any combination.

Also included in the processing device 901-1 is network interface circuitry 914, which is used to interface the processing device with the network 904 and other system components, and may comprise conventional transceivers.

The other processing devices 901 of the processing platform 900 are assumed to be configured in a manner similar to that shown for processing device 901-1 in the figure.

Again, the particular processing platform 900 shown in FIG. 9 is presented by way of example only, and system 200 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the replicated file system synchronization techniques disclosed herein. Also, the particular configuration of system and device elements shown in FIGS. 2, 3 and 5 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for processing data in a sharded distributed data storage system, wherein the sharded distributed data storage system stores said data in a plurality of shards on a plurality of storage nodes, said method comprising:

obtaining a dimensional description for a shard reorganization of said data in said sharded distributed data storage system from a user, wherein said dimensional description for said shard reorganization comprises a semantic description of a meaning of said data; and reorganizing, using a plurality of burst buffer appliances that interchange reorganized data over an interconnect network between said plurality of burst buffer appliances and wherein a given burst buffer appliance comprises a high-speed memory having a substantially lower access time than a disk storage device, a storage of said data and corresponding metadata on at least two of said storage nodes of said sharded distributed data storage system based on said dimensional description.

2. The method of claim 1, wherein said dimensional description comprises one or more of said semantic description of desired array dimensions and key range information.

3. The method of claim 1, wherein said semantic description comprises a striping of a given data array along one or more of a horizontal face, a vertical face and a sub-array of said given data array.

4. The method of claim 1, wherein said reorganizing said storage of said data stores a collection of sub-objects together on a single node of said sharded distributed data storage system for one or more analysis tasks requiring said collection.

5. The method of claim 1, wherein said reorganizing said storage of said data comprises one or more of a persist operation and a fetch operation.

6. The method of claim 1, wherein said reorganizing said storage of said data is performed in conjunction with one or more of a storage of said data on a sharded data storage array and a fetching of said data from said sharded data storage array.

7. The method of claim 1, wherein said data comprises a plurality of key-value objects and wherein said reorganizing said storage of said plurality of key-value objects splits said plurality of key-value objects at one or more specified split points for storage on a plurality of specified nodes in said sharded distributed data storage system.

8. The method of claim 1, wherein said data comprises one or more multidimensional array objects and wherein said reorganizing said storage of said one or more multidimensional array objects splits said one or more multidimensional array objects into one or more sub-arrays based on said dimensional description for storage on a plurality of specified nodes in said sharded distributed data storage system.

9. An apparatus for processing data in a sharded distributed data storage system, wherein the sharded distributed data storage system stores said data on a plurality of shards on a plurality of storage nodes, said apparatus comprising:

a memory; and at least one hardware device operatively coupled to the memory and configured to:

obtain a dimensional description for a shard reorganization of said data in said sharded distributed data storage system from a user, wherein said dimensional description for said shard reorganization comprises a semantic description of a meaning of said data; and reorganize, using a plurality of burst buffer appliances that interchange reorganized data over an interconnect network between said plurality of burst buffer appliances and wherein a given burst buffer appliance comprises a high-speed memory having a substantially lower access time than a disk storage device, a storage of said data and corresponding metadata on at least two of said storage nodes of said sharded distributed data storage system based on said dimensional description.

10. The apparatus of claim 9, wherein said dimensional description comprises one or more of said semantic description of desired array dimensions and key range information.

11. The apparatus of claim 9, wherein said semantic description comprises a striping of a given data array along one or more of a horizontal face, a vertical face and a sub-array of said given data array.

12. The apparatus of claim 9, wherein said reorganizing said storage of said data stores a collection of sub-objects together on a single node of said sharded distributed data storage system for one or more analysis tasks requiring said collection.

13. The apparatus of claim 9, wherein said reorganizing said storage of said data comprises one or more of a persist operation and a fetch operation.

14. The apparatus of claim 9, wherein said reorganizing said storage of said data is performed in conjunction with one or more of a storage of said data on a sharded data storage array and a fetching of said data from said sharded data storage array.

15. The apparatus of claim 9, wherein said data comprises a plurality of key-value objects and wherein said reorganizing said storage of said plurality of key-value objects splits said plurality of key-value objects at one or more specified split points for storage on a plurality of specified nodes in said sharded distributed data storage system.

16. The apparatus of claim 9, wherein said data comprises one or more multidimensional array objects and wherein said reorganizing said storage of said one or more multidimensional array objects splits said one or more multidimensional array objects into one or more sub-arrays based on said dimensional description for storage on a plurality of specified nodes in said sharded distributed data storage system.

17. An article of manufacture for processing data in a sharded distributed data storage system, wherein the sharded distributed data storage system stores said data on a plurality of shards on a plurality of storage nodes, said article of manufacture comprising a non-transitory machine readable recordable storage medium containing one or more programs which when executed implement the steps of:

obtaining a dimensional description for a shard reorganization of said data in said sharded distributed data storage system from a user, wherein said dimensional description for said shard reorganization comprises a semantic description of a meaning of said data; and reorganizing, using a plurality of burst buffer appliances that interchange reorganized data over an interconnect network between said plurality of burst buffer appliances and wherein a given burst buffer appliance comprises a high-speed memory having a substantially lower access time than a disk storage device, a storage of said data and corresponding metadata on at least two of said storage nodes of said sharded distributed data storage system based on said dimensional description.

18. The article of manufacture of claim 17, wherein said reorganizing said storage of said data stores a collection of sub-objects together on a single node of said sharded distributed data storage system for one or more analysis tasks requiring said collection.

19. The article of manufacture of claim 17, wherein said reorganizing said storage of said data comprises one or more of a persist operation and a fetch operation.

20. The article of manufacture of claim 17, wherein said reorganizing said storage of said data is performed in conjunction with one or more of a storage of said data on a sharded data storage array and a fetching of said data from said sharded data storage array.

* * * * *